NOVEL DEVELOPER AND PROCESS FOR THE USE THEREOF
IN ELECTROLYTIC IMAGE REPRODUCTION

Filed Oct. 23, 1959

INVENTORS
FRANK A. HAMM
RICHARD L. WEIHER
BY
Carpenter, Abbott, Coulter & Kinney
ATTORNEYS United States Patent Office 3,085,051

Patented Apr. 9, 1963

3,085,051

NOVEL DEVELOPER AND PROCESS FOR THE USE THEREOF IN ELECTROLYTIC IMAGE REPRODUCTION

Franklin A. Hamm, Stillwater, and Richard L. Weiher, St. Paul, Minn., assignors to Minnesota Mining and Manufacturing Company, St. Paul, Minn., a corporation of Delaware Filed Oct. 23, 1959, Ser. No. 848,272

19 Claims. (Cl. 204—18)

Figure 1:
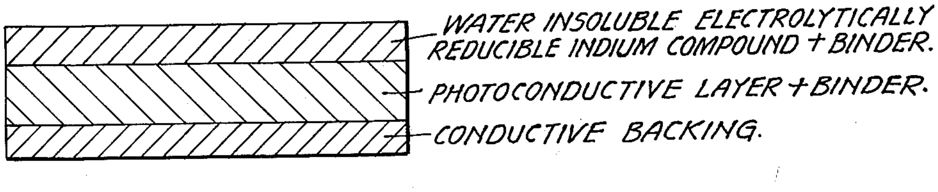

This invention relates to the formation of permanent reproduction of light images on light sensitive surfaces by methods involving electrolysis at the exposed light sensitive surface. In one aspect, this invention relates to the use of a novel electrolytically reducible developer material in the reproduction of visible images. In another aspect, this invention relates to a novel photosensitive copysheet capable of electrolytic development.

The use of photosensitive sheet materials having surface layers which become more electrically conductive when irradiated with light of certain wavelengths is known. It is known, for example, that a photoconductive material such as zinc oxide can be coated on a sheet of electrically conductive material, exposed to a light image, and subjected to electrolytically reducible developer solutions, such as an aqueous silver nitrate solution, the electrically conducting material serving as the cathode. The differential conductivity pattern produced by illumination with the light image is thereby electrolytically developed by reduction of the developer material to form a visible reproduction of the original light image. This process is described in greater detail in S.N. 575,070, filed March 30, 1956, now United States Patent Number 3,010,883. However, the reproduced images or final prints have often lacked the desired degree of stability or permanence and have been noted in many instances to fade or darken upon aging or further exposure to ordinary light.

It is therefore an object of this invention to provide a method for producing stable reproductions of light images.

It is another object of this invention to provide a novel photosensitive copysheet which is particularly useful for the reproduction of stable, high contrast images by electrolytic development techniques.

It is also an object of this invention to provide a photoconductive copysheet which contains an electrolytically reducible developer integrally associated therewith.

It is a further object to provide a novel photoconductive copysheet containing thereon a stable high contrast reproduction of a light image.

Various other objects and advantages will become apparent to those skilled in the art from the accompanying description and disclosure.

According to this invention, a photosensitive receptor sheet, comprising an electrically conductive base upon which a contiguous coating of photoconductive material is placed on bond, is exposed to a light image and is electrolytically developed by contacting the exposed surface layer of photoconductive material with an electrolytically reducible indium compound and passing current through the light exposed portions of said photoconductive material, thereby reducing the indium compound to free indium metal on the light exposed surface areas. The reduced or free indium is dark brown to black in color and provides an excellent image with outstanding stability, contrast and definition.

The above described photosensitive receptor sheet comprises an electrically conductive backing, such as conductive plastic or glass (e.g. Nesa glass), metal foil, metal plate, etc., and a contiguous layer of photoconductive material, such as cadmium sulfide, zinc oxide, etc. Zinc oxide, is the preferred photoconductive material. In bonding the photoconductive material to the electrically conductive base or backing various water resistant, flexible film forming polymeric binders can be used, provided the polymer does not adversely affect the light sensitivity of the photoconductive material and is more of an insulator than the unexposed photoconductive material. A more detailed description of such photosensitive receptor sheets and their preparation appears in U.S. S.N. 692,529, filed October 28, 1957, now United States Patent Number 3,010,884. The use of sensitizing dyes in conjunction with the photoconductive material to broaden or enhance the spectral response is often desired.

Any electrolytically reducible indium compound can be used as the developer, selection being determined primarily by its stability, color, cost and the form in which it is to be used. Where the indium compound is soluble in the electrolyte, it may be incorporated therein, either with or without additional ionizable compounds. An aqueous electrolyte is preferred, and such water soluble indium compounds as indium iodide, indium nitrate, indium perchlorate, indium sulfate, indium sulfite, indium bromide, indium trichloride, etc., can be employed. Where the electrolytically reducible indium compound is insoluble in the electrolyte it can be superimposed as a thin topcoating on the surface of the photoconductive layer, usually by means of a binder material such as earlier described. Illustrative of these water insoluble indium compounds are indium oxide (mono- and sesqui-), indium cyanide, indium sulfite, etc. Such a construction is shown in FIGURE 1.

The maximum thickness of such a topcoating is generally dependent on the tolerable decrease in light transmission to the underlying photoconductive layer, on the particle size of the insoluble indium compound, and on the particular type and quantity of binder used. Generally, the dry thickness of this topcoating is less than about 5 microns to provide suitable light transmission. In order to obtain a diffuse reflected density of 1.0 a continuous layer of $In_2O_3$ having a dry thickness of 0.5 micron is theoretically required in the absence of binder. When a binder is employed in conjunction with the insoluble indium compound the dry topcoat thickness preferably ranges from about 1.5 to about 3.5 microns, the minimum thickness consistent with the ability to produce a dense image, e.g. having a diffuse reflected density of about 1.0 or higher.

The weight ratio of the insoluble indium compound to the binder generally ranges from about 1:1 to about 8:1, with the higher ratios, i.e. about 4:1 to about 8:1, being preferred to obtain a higher reduction efficiency in the electrolytic process. Reduction efficiency is also inversely proportional, within limits, to the particle size of the indium compound. Such particle size generally ranges from about 0.01 micron to about 10 microns.

Incorporation of a light sensitive dye, such as Fluorescein, Acridine Orange, Eosin Y, Rose Bengal, Methylene Blue, etc., into the photoconductive coating increases the spectral response of the photoconductive material. This increased spectral response can be utilized to offset the transmission loss occurring in the topcoat, as will be noted by the following example.

EXAMPLE 1

A 4:1 weight ratio of ZnO/Pliolite S–7 (Pliolite S–7 is a 30:70 mole ratio copolymer of butadiene and styrene) containing 0.1 weight percent of Phosphine R dye (C.I. 788) was diluted with toluene to a thin uniform consistency and was then coated with a 4 mil knife coat spacing onto a conducting aluminum substrate. A 6:1 weight ratio $In_2O_3$/Pliolite S–7 mix in sufficient toluene to provide a thin consistency was ballmilled for 24 hours and was thereafter topcoated onto the dry zinc oxide coating of some of the above prepared samples. After the samples were dry, exposure was made with 650 foot candles of incident light for 5 seconds. The bulk conductivity ($\sigma$) was measured by contacting 0.594 cm.$^2$ of exposed surface with 1 molar $(NH_4)_2SO_4$ and impressing a voltage of 9.25 volts D.C. between the electrolyte and the conducting aluminum substrate. In Table I, $\sigma_d$ denotes bulk dark conductivity and $\sigma_5$ denotes bulk photoconductivity after five seconds exposure.

*Table I*

| Sample | $\sigma_d$(ohm-cm.)$^{-1}$ | $\sigma_5$(ohm-cm.)$^{-1}$ |
|---|---|---|
| Dyed ZnO | $3.0\times10^{-9}$ | $1.1\times10^{-5}$ |
| $In_2O_3$ topcoated over dyed ZnO | $2.5\times10^{-8}$ | $1.0\times10^{-5}$ |

The results obtained in Example 1 indicated that the indium oxide topcoated, dyed zinc oxide sample was comparable in sensitivity to the dyed zinc oxide sample, probably due to sensitization of the zinc oxide to the longer wavelengths of light which are absorbed only slightly by the indium oxide topcoating.

It was additionally observed that the topcoated sample essentially eliminated the "pinholing" effect frequently observed with the non-topcoated samples, this effect being particularly pronounced when higher electrolytic voltages are employed. This "pinholing" is attributed to localized "shorts" or film breakdown apparently resulting from small variations in film thickness. Thus, in the case of the topcoated sample, the thickness of the photoconductive, e.g. zinc oxide, layer can be reduced with less danger of "pinholing" and with a resulting increase in the rate of development or speed of the photosensitive sheet.

Although the use of a binder to permanently affix the electrolytically reducible indium compound topcoating onto the photoconductive layer is preferred, it is also possible to apply the electrolytically reducible indium compound directly onto the surface of the photoconductive layer without a binder. Thus, for example, after the mixture of photoconductive material and binder in a suitable solvent is coated onto the electrically conductive backing and before the coating is dry, the indium compound can be applied to or impressed onto the wet surface of the photoconductive film, either as a powder or in a suitable vehicle. Upon drying the indium compound is affixed to the surface of the photoconductive layer.

The photoconductive copysheet of this invention can be exposed to a light image and be developed either simultaneously or subsequently thereto by electrolytic techniques. It is a particularly preferred embodiment of this invention to use the copysheets herein described in the electrolytic process discussed earlier, since the development voltage or electrolysis voltage may be as low as about 3 volts D.C., or lower, but is generally above about 10 volts. Alternating current can also be used for electrolytic development, although direct current is preferred. Any current carrying electrolyte including tap water, can be used, either with or without the inclusion therein of electrolytically reducible developer materials.

A variety of relatively "dry" developing techniques can be employed to obviate the necessity of a "wet" electrolyte. Hence, by one method, a relatively transparent layer of a fusible solid, current carrying surface layer, such as gelatin, may be superimposed on the topcoating of electrolytically reducible indium compound, electrolysis being accomplished by passing a metal bar or roll, which may be heated if desired, connected as the anode, over the fusible surface layer. In still another technique, development is accomplished by passing a gelatin coated metal roller, connected as the anode, over the exposed, topcoated copysheet of this invention.

The topcoated copysheets of this invention showed no reciprocity failure within the limits of experiments performed. Samples were illuminated with a constant exposure of $5.2\times10^{15}$ quanta per cm.$^2$ with light of wavelength .38$\mu$ to .41$\mu$ and the time (T) and intensity (I) of illumination were varied. All samples were developed for 5 seconds with 1 molar $(NH_4)_2SO_4$ electrolyte immediately after illumination of from 4 to 40 seconds with corresponding intensities of from 1300 to 130 foot candles. The same change in optical density was noted in all samples. The efficiency of the indium reduction is independent of the applied voltage and is dependent only on the total charge passed.

The stability of the indium metal image is particularly outstanding. Boiling both in water at 100° C. and in a sodium chloride solution at 105° C. for 15 minutes had no visual effect on the image. An indium metal image developed on the topcoated copysheets of this invention was placed in an air atmosphere (76% relative humidity, 80° C.) for 120 hours with an increase in diffused reflectance of the image of less than 0.5% and a decrease in the background reflectance of less than 3.0%. A sample exposed to window light for 5 days produce no change in either the image areas or in the background. Similar results were obtained when the exposed copysheets were subjected to ordinary artificial light for approximately 30 days.

By obviating the necessity for an added developer material, the electrolytically reducible indium compound topcoated copysheet of this invention permits development procedures which are not only greatly simplified but which produce high contrast, extremely stable images at relatively low electrolysis voltages. It also eliminates the problem of stability, not only of the image but also of the developer solutions heretofore necessary with zinc oxide containing and other photoconductive copysheets. This makes it feasible to use a battery operated portable unit which is light in weight and simple to operate, a particularly useful embodiment where no external source of electrical power is available. By making electrical connection between the electrically conductive backing of the copysheet and the electrolyte, as by a short length of wire or screen, the galvanic action of the system may be utilized to develop the image without any external source of electrical potential.

A still further novel feature of indium oxide topcoated copysheets resides in the erasability of the indium metal image. Erasure can be effected by treating the developed print with acid, such as concentrated or dilute nitric acid, which dissolves the indium metal without affecting the unreduced indium oxide. Copysheets so erased can be reused by repeated exposure and electrolytic development.

The following examples are set forth for purposes of illustrating the invention.

EXAMPLE 2

A 4:1 weight ratio of $In_2O_3$ and Pliolite S-7 was diluted with toluene to thin consistency and was then topcoated 3 mils wet onto a zinc oxide coated aluminum foil. The zinc oxide coating was approximately $1.52\times10^{-3}$ cm. in thickness. This copysheet is shown in FIGURE 1. The topcoated copysheet thus prepared was then exposed for 8 seconds to a 1300 foot candle light source. Ten seconds after light shut off, with the aluminum connected as cathode and a sponge soaked with 1 molar $(NH_4)_2SO_4$ connected as anode, a potential of 45 volts D.C. was applied as the sponge was rapidly wiped over the topcoat surface. A dense, dark indium metal image was formed. Similar results were obtained when ordinary tap water was used as the electrolyte.

EXAMPLE 3

The copysheets used in this run were prepared by coating a 3 mil wet film of a 4:1 weight ratio of zinc oxide to Pliolite S-7 in toluene onto lithographic aluminum stock. After this film was dry a 3 mil wet coating of a 4:1 $In_2O_3$ to Pliolite S–7 mix in toluene was topcoated thereon and dried. The copysheets were exposed to a 1300 foot candle light source for varying times. Development was conducted 5 seconds after exposure with the aluminum backing connected as cathode and a gelatin coated roller connected as anode. Results obtained appear in Table II.

*Table II*

| Sample | D.C. Voltage | Exposure, seconds | Image Quality |
|---|---|---|---|
| 1 | 67.5 | 10 | Good. |
| 2 | 67.5 | 10 | Excellent. |
| 3 | 45 | 10 | Excellent. |

EXAMPLE 4

Figure 2:
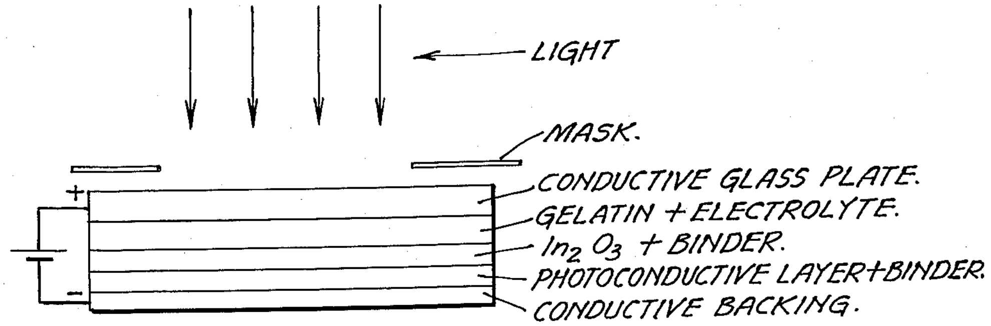

Gelatin was mixed with 0.5 molar $(NH_4)_2SO_4$ (10% gel by weight) and was coated onto the conductive surface of Nesa glass and allowed to harden. The copysheet used was similar to that described in Example 2. The gelatin coated Nesa glass was then placed on the topcoated surface of the copysheet and covered with a masking sheet, as shown in FIGURE 2. The conductive surface of the Nesa glass was connected as the anode and the aluminum backing of the copysheet was connected as the cathode. By applying a 20 volt D.C. source of electrical potential during a ten second exposure to an external light source, the light passing through the relatively transparent Nesa glass and gelatin, a dark image of good contrast was produced.

EXAMPLE 5

Using the same copysheet and gelatin mix as in Example 4, the gelatin was coated directly onto the topcoated copysheet and allowed to harden. This sheet was then exposed for 10 seconds to an external light source. A metal plate, connected as the anode, was then placed on the gelatin surface, and development of the image was carried out by applying a 20 volt D.C. potential between the metal plate and the aluminum copysheet backing. A well defined image of good density resulted.

As an additional variation it is possible to eliminate the necessity for a distinct layer of the electrolytically reducible indium compound by incorporating such a material, i.e. water soluble indium salts such as indium trichloride, etc., directly into the gelatin and coating the resulting mixture onto the photoconductive surface of the copysheet.

Various other alterations and modifications of the present invention will be apparent to those skilled in the are without departing from the scope of this invention.

We claim:

1. A process for the reproduction of a light image on a photoconductive copysheet which comprises exposing to said light image the photoconductive surface of said copysheet, said copysheet containing a photoconductive coating on a contiguous electrically conductive backing and an electrolytically reducible indium compound in contact with the surface of said photoconductive coating; and electrolytically developing said sheet by passing current selectively through the light exposed portions of said sheet to reduce said indium compound to indium metal.

2. A process for the reproduction of a light image on a photoconductive copysheet which comprises exposing to said light image the photoconductive surface of said copysheet, said copysheet containing a photoconductive coating on a contiguous electrically conductive backing and a water soluble electrolytically reducible indium compound in contact with the surface of said photoconductive coating; and electrolytically developing said sheet by passing current selectively through the light exposed portions of said sheet to reduce said indium compound to indium metal.

3. A process for the reproduction of a light image on a photoconductive copysheet which comprises exposing to said light image the photoconductive surface of said copysheet, said copysheet containing a photoconductive coating on a contiguous electrically conductive backing and a water insoluble electrolytically reducible indium compound in contact with the surface of said photoconductive coating; and electrolytically developing said sheet by passing current selectively through the light exposed portions of said sheet to reduce said indium compound to indium metal.

4. A process for the reproduction of a light image on a photoconductive copysheet which comprises exposing to said light image the photoconductive surface of said copysheet, said copysheet containing a photoconductive coating on a contiguous electrically conductive backing and a relatively light transmissive coating of a water insoluble electrolytically reducible indium compound superimposed on said photoconductive coating; and electrolytically developing said sheet by passing current selectively through the light exposed portions of said sheet to reduce said indium compound to indium metal.

5. The process of claim 4 wherein the water insoluble electrolytically reducible indium compound is indium oxide.

6. A copysheet comprising a photoconductive coating on a contiguous electrically conductive backing and a relatively light transmissive coating containing an electrolytically reducible indium compound superimposed on said photoconductive coating.

7. A copysheet comprising a photoconductive coating on a contiguous electrically conductive backing and superimposed on said photoconductive coating a relatively light transmissive coating containing a water soluble, electrolytically reducible indium compound.

8. The copysheet of claim 7 wherein the relatively light transmissive coating also contains gelatin.

9. A copysheet comprising a photoconductive coating on a contiguous electrically conductive backing and superimposed on said photoconductive coating a relatively light transmissive coating containing a water insoluble, electrolytically reducible indium compound.

10. The copysheet of claim 9 wherein the relatively light transmissive coating also contains an organic polymeric binder.

11. A copysheet comprising a photoconductive coating on a contiguous electrically conductive backing and superimposed on said photoconductive coating a relatively light transmissive coating containing indium oxide and an organic polymeric binder.

12. A method for preparing a copysheet which comprises intimately mixing an electrolytically reducible indium compound and a binder material and coating the resulting admixture onto the photoconductive surface of an electrically conductive backing sheet having a photoconductive coating thereon, said indium compound containing coating being relatively light transmissive and having a dry thickness between about 0.5 and about 5 microns.

13. A light exposed copysheet which comprises a photoconductive coating on a contiguous electrically conductive backing, and a relatively light transmissive coating containing electrolytically reducible indium superimposed on and contiguous with said photoconductive coating, the light exposed surface portions of which contain indium metal.

14. A method for preparing a copysheet which comprises intimately mixing an electrolytically reducible indium compound and a binder material, and coating the resulting admixture onto the photoconductive surface of an electrically conductive backing having a photoconductive coating thereon, said indium compound containing coating being relatively light transmissive and having a dry thickness of from about 1.5 to about 3.5 microns.

15. The method of claim 14 in which the electrolytically reducible compound is $In_2O_3$.

16. A copysheet comprising a photoconductive zinc oxide coating on a contiguous electrically conductive backing and superimposed on said zinc oxide coating a light transmissive coating containing an electrolytically reducible indium compound and an insulating, film-forming binder.

17. The copysheet of claim 16 in which said indium compound is $In_2O_3$.

18. A process for the preparation of a stable, high contrast reproduction of a light image which comprises exposing to said light image a receptor sheet containing a photoconductive zinc oxide coating on a contiguous electrically conductive backing, and a relatively light transmissive coating of an electrolytically reducible indium compound superimposed on said zinc oxide coating; and electrolytically developing said sheet in an aqueous media by passing current selectively through the light exposed portions of said sheet to reduce said indium compound to indium metal, said electrically conductive backing being connected as cathode during development.

19. The process of claim 18 in which the electrolytically reducible indium compound is $In_2O_3$.

References Cited in the file of this patent

UNITED STATES PATENTS

| | | |
|---|---|---|
| 2,423,624 | Smart | July 8, 1947 |
| 2,862,815 | Sugarman et al. | Dec. 2, 1958 |
| 2,866,903 | Berchtold | Dec. 30, 1958 |
| 3,010,883 | Johnson et al. | Nov. 28, 1961 |

FOREIGN PATENTS

| | | |
|---|---|---|
| 215,754 | Australia | June 23, 1958 |
| 188,030 | Great Britain | Oct. 23, 1922 |
| 464,112 | Great Britain | Apr. 12, 1937 |
| 151,971 | Germany | May 26, 1904 |

OTHER REFERENCES

Yates-Radio-Craft, March 1943, page 334.